United States Patent Office 3,176,911
Patented Apr. 6, 1965

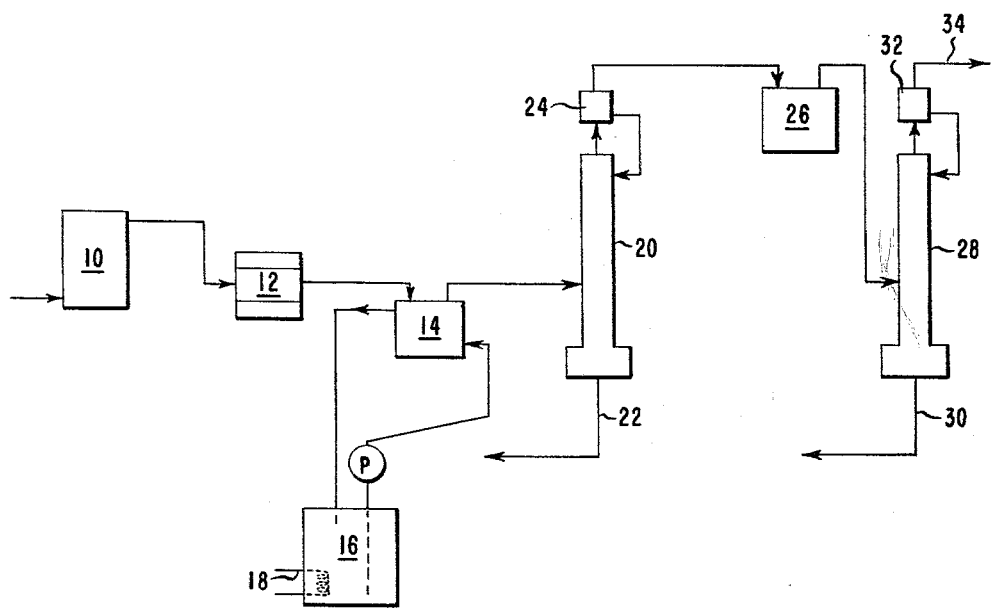

3,176,911
COMPRESSION OF GASEOUS MIXTURES
Paul C. Wallace, Pennsville, N.J., assignor to E. I. du Pont de Nemours and Company, Wilmington, Del., a corporation of Delaware
Filed May 29, 1962, Ser. No. 198,569
8 Claims. (Cl. 230—202)

This invention relates to a process for preventing the formation of tar during the compression of a gaseous mixture which consists essentially of hydrogen fluoride, acetylene, and 1,1-difluoroethane or 1,1-difluoroethane and vinyl fluoride, and particularly during such a compression which forms a part of a process for separating the components of such mixture by fractionation under pressure.

There are several situations of industrial importance where gaseous mixtures of hydrogen fluoride, acetylene, and 1,1-difluoroethane or both 1,1-difluoroethane and vinyl fluoride are encountered, as disclosed in U.S. Patents 2,401,850; 2,425,991; 2,437,148; 2,437,307; 2,442,993; 2,461,523; 2,469,848; 2,471,525; 2,519,199; 2,599,631; 2,674,632; 2,716,142; 2,716,143; and 2,892,000. It is usually desired to recover the 1,1-difluoroethane and the vinyl fluoride from such mixtures. While the hydrogen fluoride can be readily removed from such mixtures by absorption in aqueous liquids, reaction with alkaline materials and the like, unreacted anhydrous hydrogen fluoride is a valuable material and it is desirable to recover it from said gaseous mixtures. It has been the commercial practice to separate such mixtures into their component parts by first compressing the mixture in a piston type compressor and into a fractionation column operating in the range of about 60 to about 100 p.s.i.g. wherein the hydrogen fluoride, the highest boiling component of the mixture, is condensed and removed at the bottom of the column while the 1,1-difluoroethane, acetylene, and other materials (which may contain up to 2% HF) are taken overhead and then are compressed in a second piston type compressor and into a second fractionation column operating at a higher pressure, e.g. 350 p.s.i.g., wherein the 1,1-difluoroethane is condensed and separated at the bottom of the column and the vinyl fluoride (when present), together with the remaining gaseous products, are recovered as overhead and treated for further purification or, in the absence of vinyl fluoride, are generally vented as waste. In such process, the feed stock to the first compressor is at a temperature about 5° C. to about 10° C. above the dew point of the uncompressed mixture so as to prevent the formation of liquid in the compressor and eventual rupture of the condenser cylinder. The compressors and the reflux condensers (associated with the fractionation columns) have been cooled by ordinary cooling water, at a temperature of from about 20° C. to about 25° C., the cooling water leaving the cooling jacket of the first compressor at a temperature of about 40° C. whereby the parts of that compressor are maintained at a temperature of about 40° C.

In carrying out such process under such conditions with gaseous mixtures containing hydrogen fluoride in concentrations of 5% by weight or more, it was found that considerable amounts of tar were formed in the first compressor, causing pluggage of the valves and accompanied by excessive wear of the compressor piston rings and rod seals resulting in excessive seal leakage and piston leakage and leading to failure of the compressor within 4 to 20 hours. This has made it necessary to completely shut down the system to clean and repair the damage to the compressor. From an operational viewpoint such frequent failure of the compressors and interruption of the operation are intolerable since compressors should operate thousands of hours before overhaul becomes necessary. The tar formation and accompanying difficulties do not occur in the second compressor which operates on gaseous mixtures which contain little or no hydrogen fluoride, less than 5% by weight, usually less than 2% by weight of the mixture.

It is an object of this invention to provide an improved process for compressing gaseous mixtures which consist essentially of hydrogen fluoride, acetylene, and a member of the group consisting of 1,1-difluoroethane and mixtures of 1,1-difluoroethane and vinyl fluoride, the hydrogen fluoride constituting at least 5% by weight of the mixture, which process overcomes the difficulties hereinabove discussed, particularly preventing the formation of tar in the compressor. A further object is to provide an improvement in the separation of the components of gaseous mixtures of the above character in fractionation columns operating under elevated pressures. A particular object is to provide an improved process for separating hydrogen fluoride from the gaseous mixtures of the foregoing character in fractionation columns operating under elevated pressures. Other objects are to advance the art. Still other objects will appear hereinafter.

The above and other objects may be accomplished in accord with this invention which comprises the process for preventing the formation of tar during compression of a gaseous mixture which consists essentially of hydrogen fluoride, acetylene, and a member of the group consisting of 1,1-difluoroethane and mixtures of 1,1-difluoroethane and vinyl fluoride, the hydrogen fluoride constituting from 5% to about 70% by weight of the mixture, which process comprises (a) Passing the gaseous mixture at a temperature of from about 50° C. to about 100° C. to a piston type compressor,
(b) Compressing the mixture to a pressure of from 15 to 100 p.s.i.g.,
(c) And heating the parts of the compressor that are in contact with the mixture to a temperature of from 5° C. to about 100° C. above the dew point of the compressed mixture during the compression.

It will be understood that the "dew point" of the gaseous mixture is the temperature at which the highest boiling component begins to condense out of the mixture under the particular pressure. The dew point of the *compressed* mixture is the dew point at the highest pressure under which it is compressed in the particular compressor.

It has been found that the dew points of the gaseous mixtures here involved increase as the pressure increases, increasing from about 45° C. at 10 p.s.i.g. to about 90° C. at 70 p.s.i.g. Therefore, in the operation of the first compressor in accordance with the present invention, the temperature (e.g. 100° C.) of the parts of the compressor that are in contact with the material being compressed is considerably higher than the temperatures to which the compressor and the mixture are subjected in the prior commercial process. It would be expected that the subjection of the gaseous mixtures to such higher temperatures would lead to an increase in the amount of tar formed. However, it has been found that, by operating the compressor under the conditions of this invention, that is, with the parts thereof in contact with the mixture being compressed heated to a temperature at least 5° C. above the dew point of the compressed mixture, effectively prevented the formation of tar in the compressor. At the same time, pluggage of the valves and excessive wear of the compressor piston rings and rod seals were eliminated, whereby the compressor could be operated for thousands of hours without the before-encountered failures of the compressor.

The tar is a thick liquid which appears to contain some rather hard particles that appear to cause the excessive wear of the piston rings, seals, and the like. The exact nature of the tar formed is not known, nor is the exact cause of its formation. Both hydrogen fluoride and acetylene must be present for the tar to form, and complete absence of either prevents tar formation. Strangely, the gaseous mixture employed must contain the hydrogen fluoride in a concentration of at least about 5–8% for the tar formation to occur, tar formation not occurring at significantly lower concentrations of hydrogen fluoride. On the other hand, the presence of even traces, less than 0.1%, of acetylene will cause tar formation, the rate of tar formation increasing with increase in the concentration of acetylene.

The gaseous mixtures, which are to be treated in the process of this invention, consist essentially of hydrogen fluoride, acetylene, and a member of the group consisting of 1,1-difluoroethane and mixtures of 1,1-difluoroethane and vinyl fluoride, with the hydrogen fluoride constituting at least 5% by weight of the mixture and particularly from 5% to about 70% by weight. Usually, such mixtures are obtained by reacting acetylene with hydrogen fluoride in the presence of a catalyst or by the pyrolysis or catalytic dehydrofluorination of 1,1-difluoroethane. For example, representative mixtures of hydrogen fluoride, acetylene, and 1,1-difluoroethane, containing little or no vinyl fluoride, are obtained by the reaction of acetylene with hydrogen fluoride in the presence of boron trifluoride as described by Burke et al. in U.S. Patent 2,425,991. Such mixtures usually contain from about 2 to about 5 mols of hydrogen fluoride per mol of 1,1-difluoroethane; small amounts, less than 10% by weight, of acetylene; from about 0.5% to about 5% by weight of boron trifluoride; and small amounts of organic by-products, such as ethane, ethylene, propylene and the like, which are lower boiling than hydrogen fluoride. Other representative mixtures are obtained by reacting acetylene with hydrogen fluoride in the presence of aluminum fluoride or aluminum oxide as disclosed by Hillyer et al. in U.S. Patent 2,471,525, such mixtures containing major amounts of hydrogen fluoride, acetylene, 1,1-difluoroethane and vinyl fluoride; usually in the proportion of about 35% to about 70% by weight of hydrogen fluoride, about 15% to about 30% by weight of acetylene, about 6% to about 10% by weight of 1,1-difluoroethane, about 10% to about 25% by weight of vinyl fluoride, and about 0.5% to about 3% by weight of low boiling by-products, predominantly ethylene. Still other representative gaseous mixtures of hydrogen fluoride, acetylene, 1,1-difluoroethane and vinyl fluoride are obtained by the pyrolysis or dehydrofluorination of 1,1-difluoroethane over a catalyst, such as aluminum sulfate, as described by Skiles in U.S. Patent 2,674,632; such mixtures usually consisting of about 10% to about 30% by weight of hydrogen fluoride, about 0.1% to about 5% by weight of acetylene, about 40% to about 70% by weight of 1,1-difluoroethane, about 20% to about 30% by weight of vinyl fluoride, and about 1% or less by weight of low boiling by-products. This invention is particularly adapted to the treatment of the gaseous mixtures obtained by the process of Skiles. On occasion, the gaseous mixtures will contain traces of sulfur dioxide and/or water. Water appears only when fresh catalyst is being used, and usually is absent. Other gaseous mixtures within the scope of this invention may be prepared by other methods and obtained from other sources as will be apparent to those skilled in the art.

The invention may be more clearly understood by reference to the accompanying diagrammatical drawing of the system in which the invention usually is employed, which system comprises a source 10 of the gaseous mixture to be treated, such as a reactor; a heat exchanger 12; a first piston type compressor 14 provided with a jacket through which a heat exchange liquid is circulated from a reservoir 16 having a heating element 18; a first fractionation column 20 having a discharge line 22 at the bottom and a reflux condenser 24 at the top; a second, piston type compressor 26 having a jacket through which a cooling liquid is circulated; and a second fractionation column 28, having a discharge line 30 at the bottom, and a reflux condenser 32 at the top provided with a gas discharge line 34. The pieces of equipment are connected in series, as shown, by suitable piping. The heating element 18 may be an electrical heating element, or a coil containing a circulating hot heat exchange fluid, or may be replaced by other conventional means for heating the reservoir 16 and its contents to the required temperature.

The various elements of the system are of conventional design constructed to withstand the pressures and temperatures involved, as is known to those skilled in the art. Also, at least those parts of the equipment, which will be in contact with gases containing hydrogen fluoride, should be constructed of materials which are resistant to the action of warm hydrogen fluoride. In general, they can be fabricated from steel, Inconel and similar high nickel alloys, or stainless steel. Piston rings, seals, and gaskets may be made of carbon polytetrafluoroethylene, and the like which also resist the action of warm hydrogen fluoride.

In the usual operation of the system with a gaseous mixture consisting essentially of hydrogen fluoride, acetylene, and 1,1-difluoroethane, with or without vinyl fluoride; the gaseous mixture to be treated issues from the source 10, usually under a pressure of from about 5 to about 10 p.s.i.g. (lbs. per sq. in. gauge) and passes to the heat exchanger 12 where its temperature is adjusted to the desired compression temperature, usually from about 50° C. to about 60° C., and then passes to the compressor 14 where it is compressed to a pressure of from about 60 to about 90 p.s.i.g., preferably from about 60 to about 70 p.s.i.g. During such compression, the parts of the compressor in contact with the gaseous mixture are maintained at a temperature at least 5° C. above the dew point of the compressed mixture by circulation of the heat exchange fluid which has been heated to such temperature in the reservoir 16. The compressed gas passes into the fractionation column 20 where it is fractionated at such pressure, and condensed hydrogen fluoride is separated at the bottom of the column and removed through the discharge line 22 for storage or reuse. The remaining gaseous products pass out of the reflux condenser 24 and into compressor 26 where they are compressed to a higher pressure, e.g. 350 p.s.i.g. The compressed mixture from compressor 26 passes into fractionation column 28 where it is fractionated under such higher pressure, and 1,1-difluoroethane is condensed and separated at the bottom of the column and discharged through discharge line 30 for reuse or storage. The remaining gaseous products such as vinyl fluoride (when present), acetylene, and small amounts of other by-products are separated in the reflux condenser 32 and pass out through discharge line 34 for further treatment when they contain vinyl fluoride, or venting as waste when they do not contain vinyl fluoride or other valuable products. The reflux condensers 24 and 32 and the compressor 26 usually are cooled by ordinary cooling water, i.e. at about 20° C. to about 25° C.

In the prior commercial process for operating this system, the compressor 14 was cooled by ordinary cooling water at 20° C.–25° C. which left the jacket of the compressor at about 40° C., whereby the parts of the compressor were maintained at a temperature of about 40° C. during the compression.

Usually, the gaseous mixture from the source or reactor 10 will be at a temperature above that at which the mixture is to be compressed, whereby the heat exchanger 12 will be operated to cool the mixture to the desired temperature. If the gaseous mixture is at too low a temperature, the heat exchanger will be operated to heat the mixture and, if the gaseous mixture at the source 10 is at the desired temperature, the heat exchanger 12 becomes unnecessary and will be by-passed or eliminated.

The pressures to which the gaseous mixtures will be compressed in the compressor according to the process of this invention may range from 15 to 100 p.s.i.g. Usually the gaseous mixture will be compressed under a pressure from about 60 to about 90 p.s.i.g., preferably from about 60 to about 70 p.s.i.g. at which the compressed gaseous mixture will have a dew point of from about 90° C. to about 95° C.

The parts of the compressor that are in contact with the material being compressed should be heated to a temperature of at least 5° C. above the dew point of the compressed mixture and may range up to about 100° C. above that dew point. Generally, it will be preferred to heat the compressor to a temperature of from 5° C. to about 15° C. above the dew point of the compressed mixture.

Usually, the heat transfer medium, employed to heat the first compressor in accordance with this invention, will be a conventional heat exchange liquid higher boiling than water, although heated water may be used in some cases where the compressor is operated in the lower ranges of pressures and temperatures. The higher boiling heat exchange liquids may be glycols, such as ethylene glycol, propylene glycol, glycol ethers, and the like; the eutectic mixture of diphenyl and diphenyl oxide sold under the trade name "Dowtherm," and like heat transfer liquids. Ethylene glycol is preferred.

In order to more clearly illustrate this invention, preferred modes of practicing it and the advantageous results to be obtained thereby, the following example is given, which includes a comparison with the prior commercial process, and in which the proportions are by weight except where specifically indicated otherwise.

*Example*

1,1-difluoroethane was dehydrofluorinated on a commercial scale, using the process of Skiles as described in U.S. Patent 2,674,632 and particularly Example I thereof, at a feed rate of about 250 pounds per hour of 1,1-difluoroethane. The temperature was adjusted so that an average of 35% conversion occurred. The product obtained thereby had an average composition of 67.7% by weight 1,1-difluoroethane, 20.7% by weight vinyl fluoride, 11% hydrogen fluoride, 0.25% acetylene, and 0.30% inerts and low boilers. Such mixture was treated in the system shown in the drawings.

(A) The mixture, produced in the reactor 10, was passed through the heat exchanger 12 where its temperature was adjusted to 50° C. to 60° C. It was under a pressure of 5–10 p.s.i.g., whereby it had a dew point of 45° C. to 50° C. It was passed into the first compressor 14 which was cooled with cooling water (20° C. to 25° C.) whereby it operated at 40° C. to 50° C. The gaseous mixture was compressed in the compressor 14 to 60–70 p.s.i.g., whereby it had a dew point of 90° C. to 95° C. The compressed gaseous mixture was passed to the fractionation column 20, operating at 60–70 p.s.i.g. Condensed hydrogen fluoride was removed from the bottom of the column while the remainder of the material, containing up to 1% HF, was passed into the second compressor 26, compressed to 350 p.s.i.g. and passed into the second fractionation column 28. 1,1-difluoroethane was removed from the bottom of the column 28, while vinyl fluoride, mixed with the acetylene and the other low boilers, was removed at the top for further purification. In a series of runs, it was found that the first compressor 14 would run between four and twenty hours before failure. In one case, the rod packing failed due to excessive wear; in another case, valve pluggage due to tar occurred; and, in several cases, the piston rings failed due to wear. In every case, after failure, the cylinder of the compressor was found to contain tar. It was felt that this tar, which contained some solids, worked its way between the piston rings and the cylinder walls or between the rod and rod packing seals, causing the excessive wear.

(B) The coolant for the first compressor was then replaced with ethylene glycol maintained at 100° C. by heating in the reservoir 16, whereby the parts of the compressor in contact with the gaseous mixture were heated to about 100° C., about 5° C. to about 10° C. above the dew point of the compressed mixture. The system was then operated on the same gaseous mixture, in the same manner, and under conditions which, except for the heating of the compressor 14, were the same as before (in A). The compressor was run for 500 hours without incident. Inspection, while the system was shut down for other causes, showed no tars and only normal wear. The compressor was then put back in service for a further 1000 hours and again inspected with the same results. The wear is the same as that observed where no tar is encountered. Heating the compressor itself therefore completely eliminated tar formation and the wear due to tar formation.

It will be understood that the preceding example has been given for illustrative purposes solely and that this invention is not limited to the specific embodiment described therein. On the other hand, it will be readily apparent to those skilled in the art that, subject to the limitations set forth in the general description, many variations can be made in the gaseous mixtures treated and in the pressures, temperatures, and other conditions and procedures employed without departing from the spirit and scope of this invention.

From the foregoing description, it will be apparent that the present invention provides a new and improved process for compressing the gaseous mixtures of the defined class, particularly as an incident to the separation of the valuable components of the mixtures and especially to the separation of hydrogen fluoride from such mixtures, whereby serious operational difficulties have been overcome resulting in material advantages and economies in the process. The change from the prior art process is simple and easily accomplished, and produces very material, surprising, and unexpected results. Accordingly, it will be apparent that this invention constitutes a valuable advance in and contribution to the art.

The embodiments of the invention in which an exclusive property or privilege is claimed are defined as follows:

1. The process for preventing the formation of tar during compression of a gaseous mixture which consists essentially of hydrogen fluoride, acetylene, and a member of the group consisting of 1,1-difluoroethane and mixtures of 1,1-difluoroethane and vinyl fluoride, the hydrogen fluoride constituting from 5% to about 70% by weight of the mixture, which process comprises
   (a) passing the gaseous mixture at a temperature of from about 50° C. to about 100° C. to a piston type compressor,
   (b) compressing the mixture to a pressure of from 15 to 100 p.s.i.g.,
   (c) and heating the parts of the compressor that are in contact with the mixture to a temperature of from 5° C. to about 100° C. above the dew point of the compressed mixture during the compression.

2. The process for preventing the formation of tar during compression of a gaseous mixture which consists essentially of hydrogen fluoride, acetylene, and 1,1-difluoroethane, the hydrogen fluoride constituting from 5% to about 70% by weight of the mixture, which process comprises
   (a) passing the gaseous mixture at a temperature of from about 50° C. to about 100° C. to a piston type compressor,
   (b) compressing the mixture to a pressure of from about 60 to about 90 p.s.i.g.,
   (c) and heating the parts of the compressor that are in contact with the mixture to a temperature of from 5° C. to about 100° C. above the dew point of the compressed mixture during the compression.

3. The process for preventing the formation of tar during compression of a gaseous mixture which consists essentially of hydrogen fluoride, acetylene, 1,1-difluoroethane, and vinyl fluoride, the hydrogen fluoride constituting from 5% to about 70% by weight of the mixture, which process comprises
(a) passing the gaseous mixture at a temperature of from about 50° C. to about 100° C. to a piston type compressor,
(b) compressing the mixture to a pressure of from about 60 to about 90 p.s.i.g.,
(c) and heating the parts of the compressor that are in contact with the mixture to a temperature of from 5° C. to about 100° C. above the dew point of the compressed mixture during the compression.

4. The process for preventing the formation of tar during compression of a gaseous mixture which consists essentially of about 10% to about 30% by weight of hydrogen fluoride, about 0.1% to about 5% by weight of acetylene, about 40% to about 70% by weight of 1,1-difluoroethane, and about 20% to about 30% by weight of vinyl fluoride, which process comprises
(a) passing the gaseous mixture at a temperature of from about 50° C. to about 100° C. to a piston type compressor,
(b) compressing the mixture to a pressure of from about 60 to about 90 p.s.i.g.,
(c) and heating the parts of the compressor that are in contact with the mixture to a temperature of from 5° C. to about 100° C. above the dew point of the compressed mixture during the compression.

5. The process for preventing the formation of tar during compression of a gaseous mixture which consists essentially of hydrogen fluoride, acetylene, and a member of the group consisting of 1,1-difluoroethane and mixtures of 1,1-difluoroethane and vinyl fluoride, the hydrogen fluoride constituting from about 10% to about 70% by weight of the mixture, which process comprises
(a) passing the gaseous mixture at a temperature of from about 50° C. to about 60° C. to a piston type compressor,
(b) compressing the mixture to a pressure of from about 60 to about 70 p.s.i.g.,
(c) and heating the parts of the compressor that are in contact with the mixture to a temperature of from 5° C. to about 15° C. above the dew point of the compressed mixture during the compression.

6. The process for preventing the formation of tar during compression of a gaseous mixture which consists essentially of hydrogen fluoride, acetylene, and 1,1-difluoroethane, the hydrogen fluoride constituting from about 10% to about 70% by weight of the mixture, which process comprises
(a) passing the gaseous mixture at a temperature of from about 50° C. to about 60° C. to a piston type compressor,
(b) compressing the mixture to a pressure of from about 60 to about 70 p.s.i.g.,
(c) and heating the parts of the compressor that are in contact with the mixture to a temperature of from 5° C. to about 15° C. above the dew point of the compressed mixture during the compression.

7. The process for preventing the formation of tar during compression of a gaseous mixture which consists essentially of hydrogen fluoride, acetylene, 1,1-difluoroethane, and vinyl fluoride, the hydrogen fluoride constituting from about 10% to about 70% by weight of the mixture, which process comprises
(a) passing the gaseous mixture at a temperature of from about 50° C. to about 60° C. to a piston type compressor,
(b) compressing the mixture to a pressure of from about 60 to 70 p.s.i.g.,
(c) and heating the parts of the compressor that are in contact with the mixture to a temperature of from 5° C. to about 15° C. above the dew point of the compressed mixture during the compression.

8. The process for preventing the formation of tar during compression of a gaseous mixture which consists essentially of about 10% to about 30% by weight of hydrogen fluoride, about 0.1% to about 5% by weight of acetylene, about 40% to about 70% by weight of 1,1-difluoroethane, and about 20% to about 30% by weight of vinyl fluoride, which process comprises
(a) passing the gaseous mixture at a temperature of from about 50° C. to about 60° C. to a piston type compressor,
(b) compressing the mixture to a pressure of from about 60 to 70 p.s.i.g.,
(c) and heating the parts of the compressor that are in contact with the mixture to a temperature of from 5° C. to about 15° C. above the dew point of the compressed mixture during the compression.

References Cited by the Examiner
UNITED STATES PATENTS

| | | | |
|---|---|---|---|
| 514,172 | 2/94 | Torchiani | 239—135 |
| 2,990,161 | 6/61 | Blaskowski | 165—134 X |
| 3,071,935 | 1/63 | Kapeker | 62—503 X |

LAURENCE V. EFNER, *Primary Examiner.*
ROBERT M. WALKER, *Examiner.*